United States Patent Office 3,357,007
Patented Dec. 5, 1967

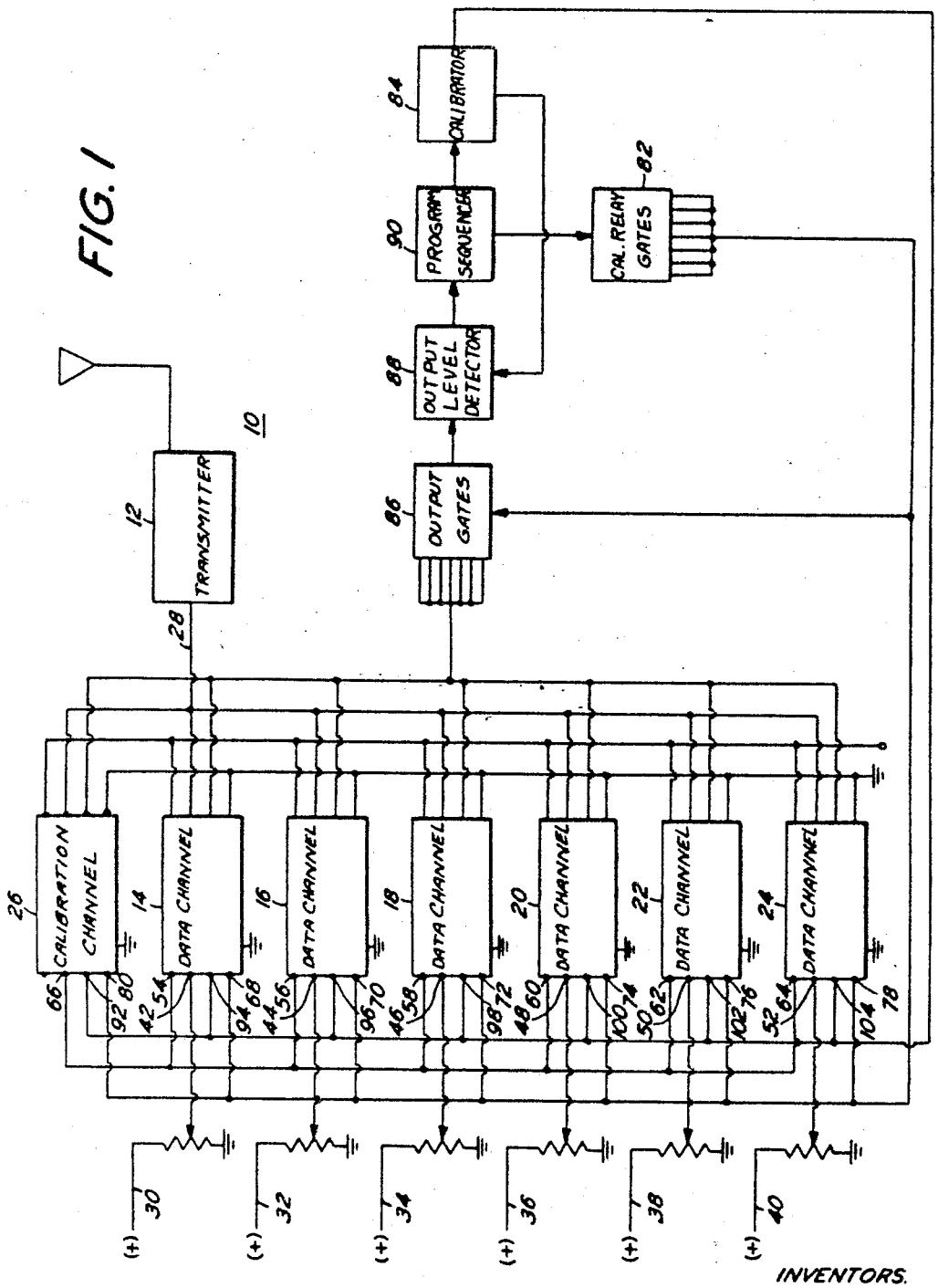

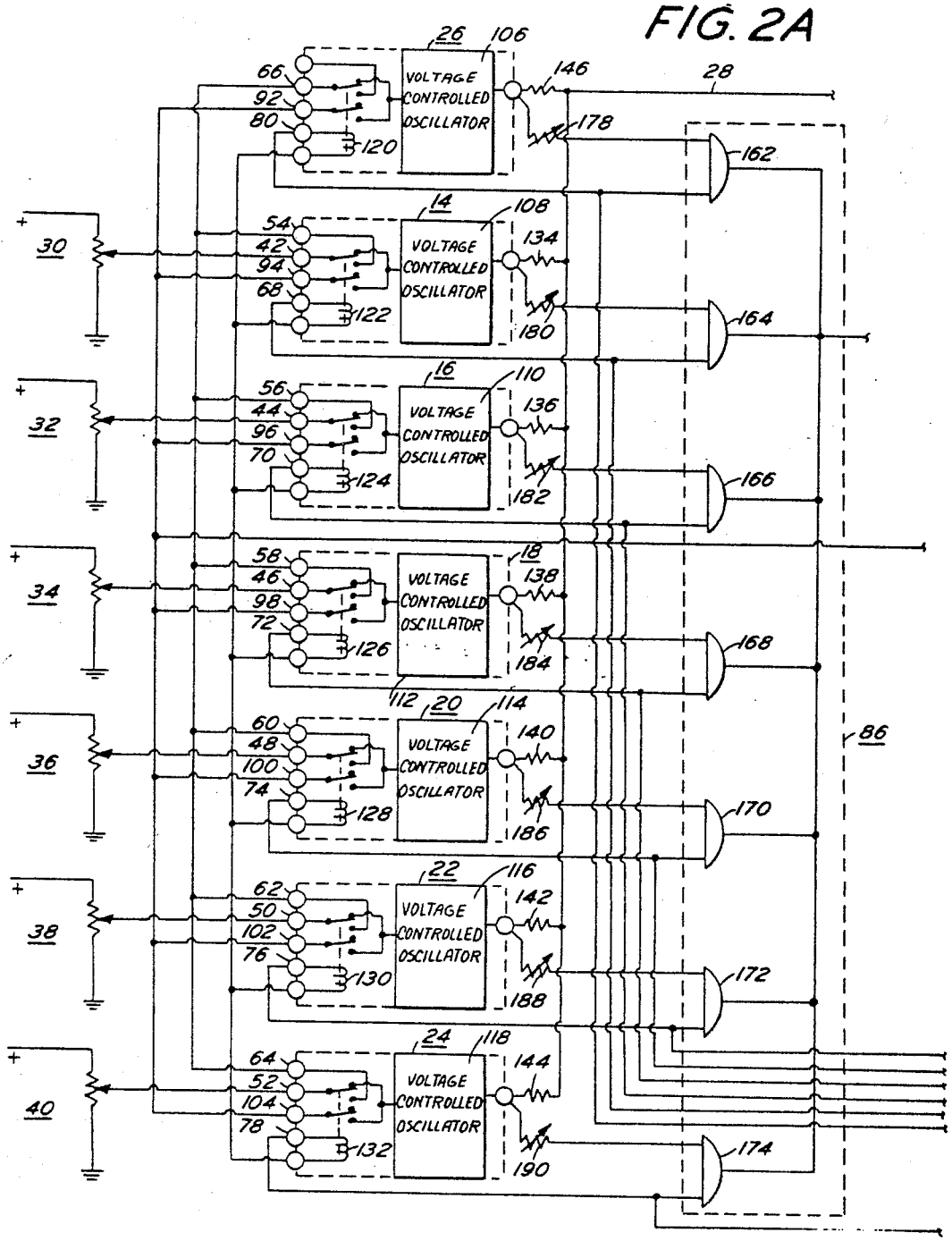

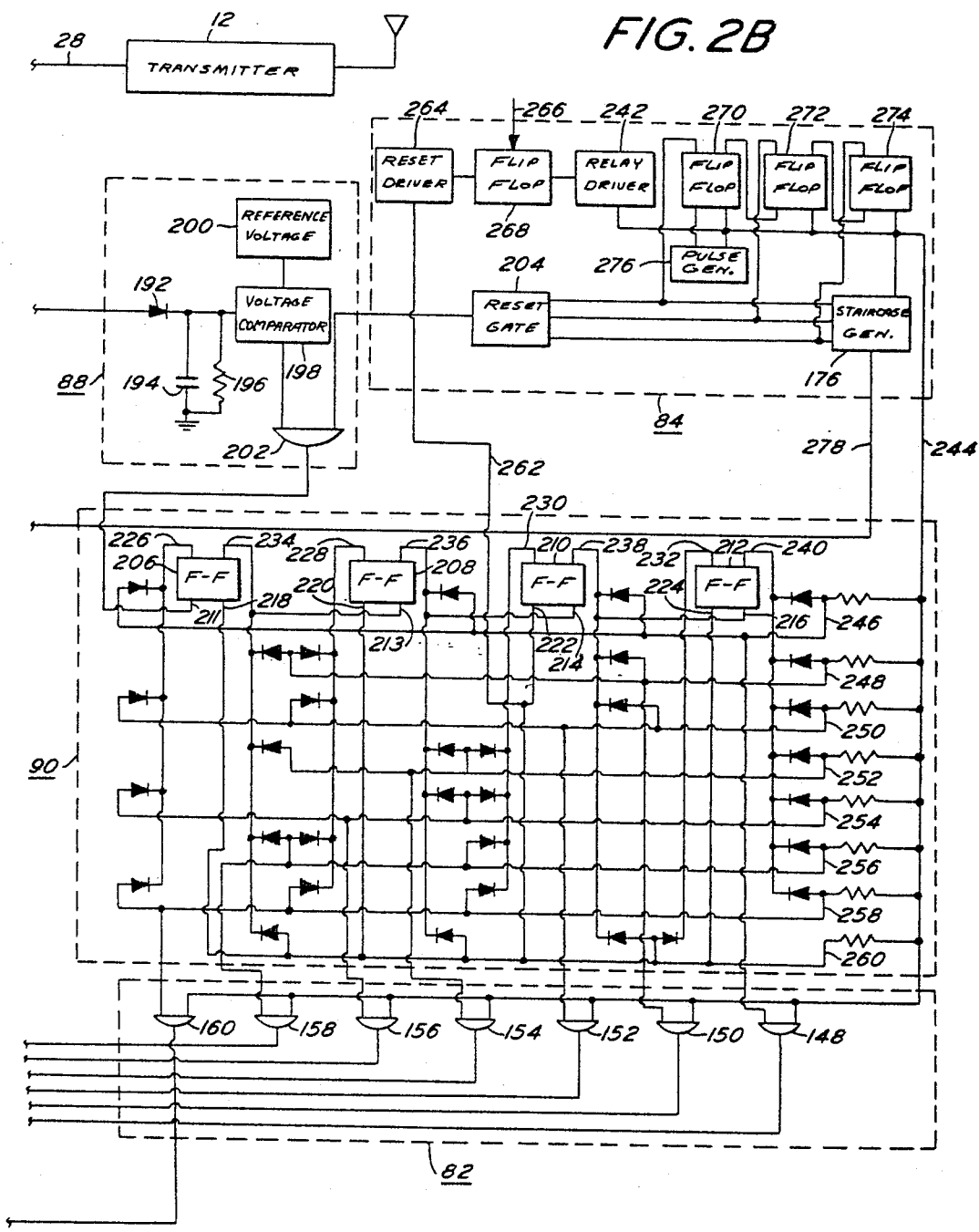

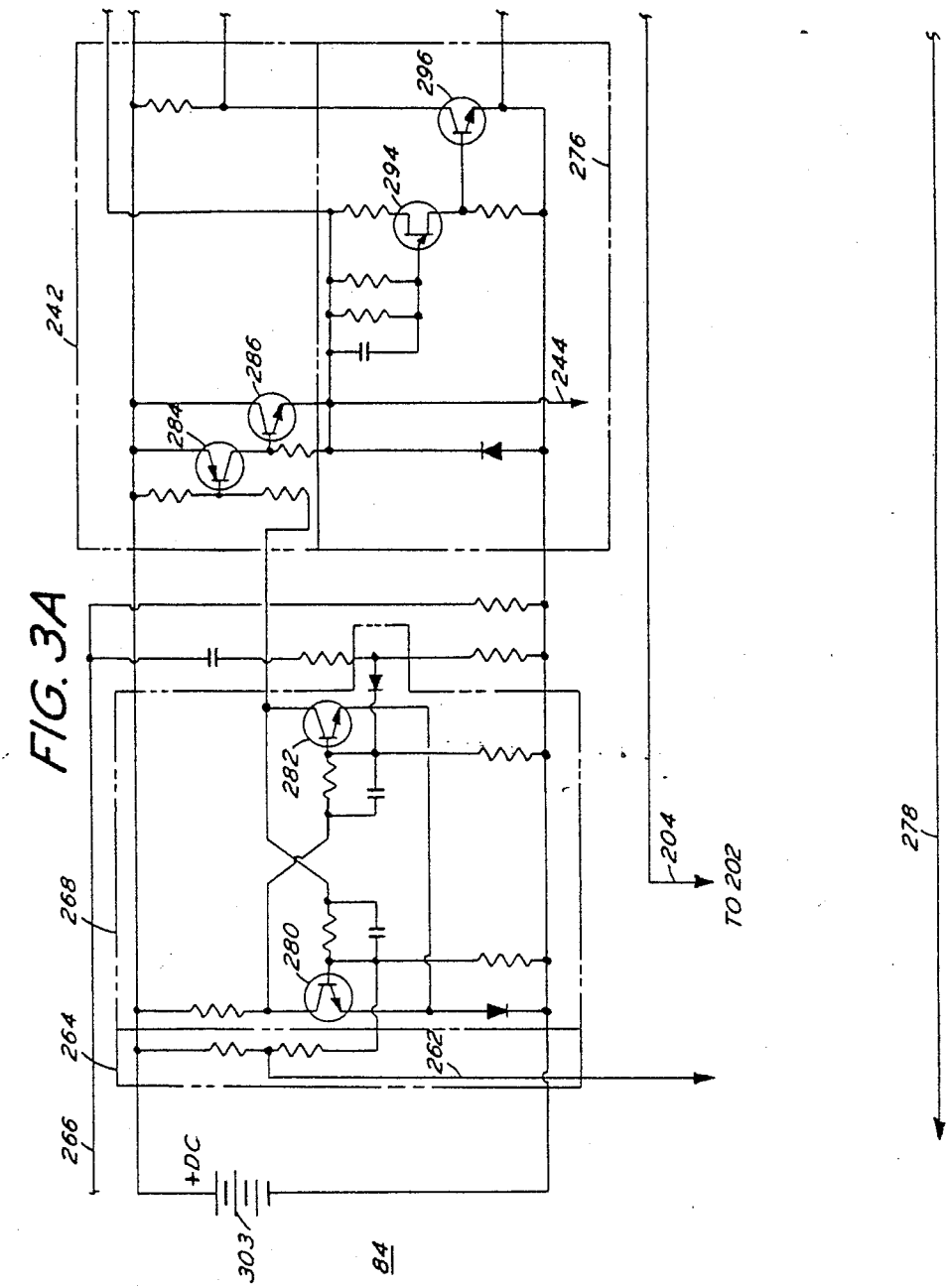

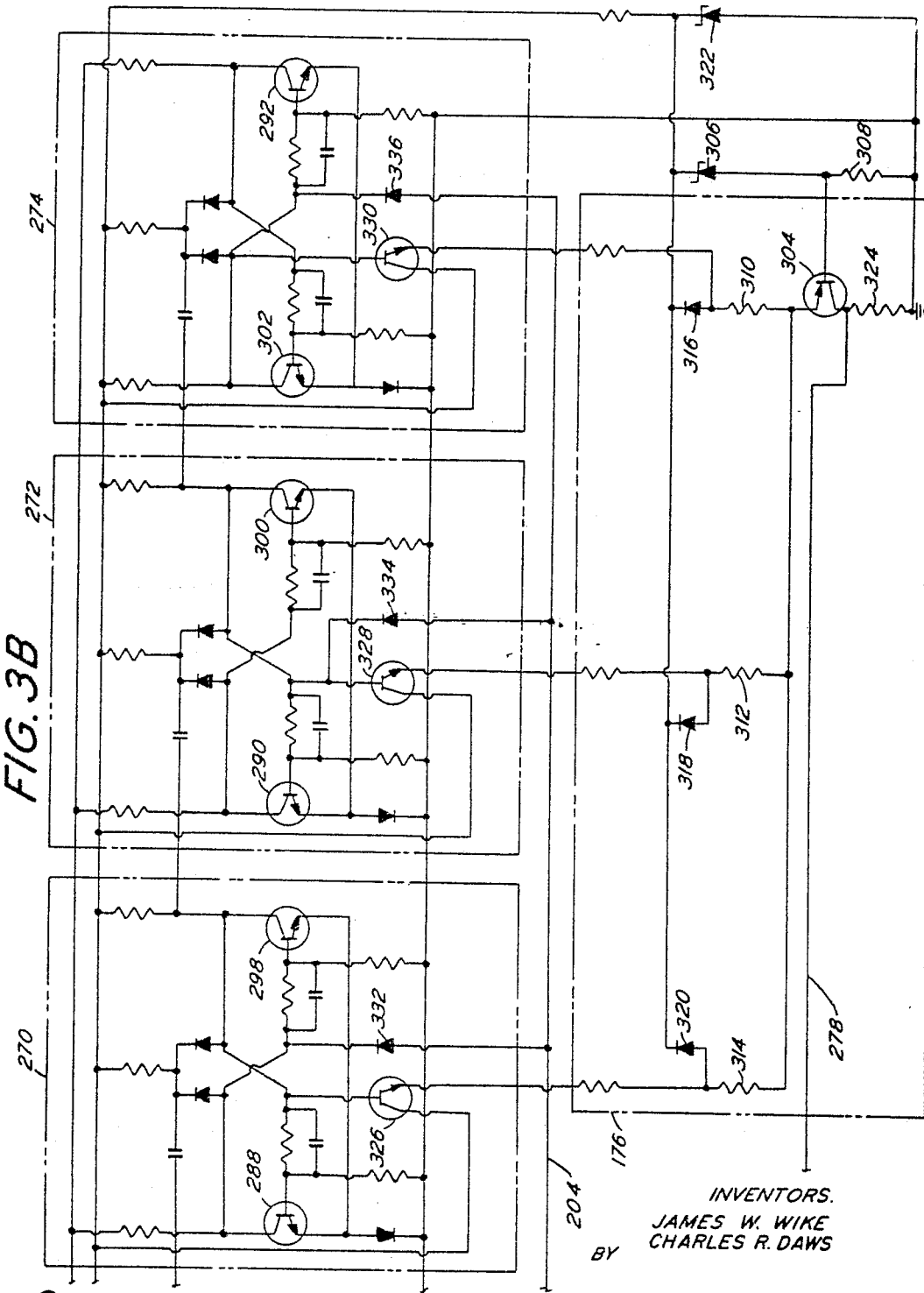

3,357,007
TELEMETRY SYSTEM WITH CALIBRATION SIGNAL CHANNEL FOR TRANSMITTING DATA CONCURRENTLY WITH THE TESTING OF DATA CHANNELS
James W. Wike, Philadelphia, Pa., and Charles R. Daws, Marina Del Rey, Calif., assignors to Sonex, Inc., Philadelphia, Pa., a corporation of Pennsylvania
Filed Mar. 16, 1965, Ser. No. 440,214
15 Claims. (Cl. 340—183)

ABSTRACT OF THE DISCLOSURE

A calibration system having a calibration channel in addition to the standard data channels of a telemetry system. The calibration channel is connected to the data input from a particular channel which is calibrated during a given calibration period. While the particular channel is being calibrated, it is supplied with an input staircase voltage signal for checking the output thereof at various levels of input information. If the channel is correctly calibrated, a signal is provided for returning this particular calibrated channel to its input source and connecting the input of a next data channel to the calibration channel while this last mentioned data channel is being calibrated. If any given channel does not operate in the manner desired, its information continues to be fed to the calibration channel so that no information is transmitted over the defective channel.

In general, this invention relates to a new and improved telemetry system and more particularly to a telemetry system capable of self calibration without loss in transmission or receipt of information. Further, this invention is related to a calibration system capable of generating step voltage signals without the need for special precision resistors and switching components.

In the past, telemetry systems utilizing a plurality of channels to transmit information were calibrated while in operation by checking each of the channels simultaneously during an extended (approximately ½ second) period to determine whether the channels were operating in their desired mode. This system was limited in that, during the period in which calibration took place, information to be transmitted would be lost. Further, if any particular channel was not operating correctly, there were no available substitutes to replace the non-functioning channel and thus valuable information was lost. Additionally, where substitution channels were prvoided, there was no orderly means of incorporating them in the system at the time of a failure.

In a particular telemetry system presently in use, a plurality of voltage controlled oscillators are utilized for transmitting different sets of information signals. These voltage controlled oscillators utilize different sub-carrier frequencies and are combined for transmission to a remote location. This system is especially useful in missile or other guidance systems.

Further, in the past, where there has been a need for a staircase voltage generator in telemetry systems, it has required the utilization of precision resistors in combination with a constant voltage source. Thus, the precision resistors were placed into circuit relation to achieve the staircase function by way of static switching elements or relays. This was an expensive method which required a large number of relays or static components which detracted from the reliability of the system.

Accordingly, it is the general object of this invention to avoid and overcome the foregoing and other difficulties of prior art practices by the provision of a new and better telemetry system.

Another object of this invention is the provision of a new and more reliable telemetry system which will calibrate all of the channels of the system without the loss of any information.

A further object of this invention is the provision of a new and better telemetry system which will detect the failure of any single channel thereof and immediately substitute a working channel for the one that has failed.

A still further object of this invention is the provision of a new and better telemetry system which can be calibrated in accordance with command signals from a remote area while insuring continuous data recordation during any calibration cycle.

Still another object of this invention is the provision of a new and better staircase generator for telemetry systems which will be reliable, have fewer components, and be extremely accurate in operation.

Other objects will appear hereinafter.

The aforesaid objects of the present invention are achieved by the provision of a calibrating channel in addition to the standard data channels of a telemetry system, which calibration channel is connected to the data input from a particular channel being calibrated during a given calibration period. While being calibrated, the particular channel is supplied with an input staircase voltage signal for checking the output thereof at various levels of input information. If the channel is correctly calibrated, a signal is provided for returning this particular calibrated channel to its input source and connecting the input of a next data channel to the calibration channel while this last mentioned data channel is being calibrated. If any given channel does not operate in the manner desired, its information will continue to be fed to the calibration channel, so that no information will be transmitted over the defective channel.

Further, in providing the staircase voltage signal utilized during the calibration step, there has been utilized a staircase voltage generator which eliminates the need for special precision resistors and mechanical or static switching elements associated therewith. Rather, the present invention utilizes a constant current generator whose characteristic is dependent upon the resistance in its emitter circuit, which resistance is varied by utilizing parallel resistors in combination with a counter-switching circuit combined with the emitter circuit of the constant current generator so that the single element constant current generator will achieve all of the stepping functions without the need for specially designed precision resistors or relays.

Other objects and many of the attendant advantages of this invention will be readily appreciated as the same becomes better understood by reference to the following detailed description when considered in connection with the accompanying drawings wherein:

FIG. 1 is a block diagram showing the telemetry system of the present invention;

FIGS. 2A and 2B are an expanded showing of the block diagram of FIG. 1;

FIGS. 3A and 3B are a circuit diagram of the calibrator circuit of FIG. 2; and

Figure 4:
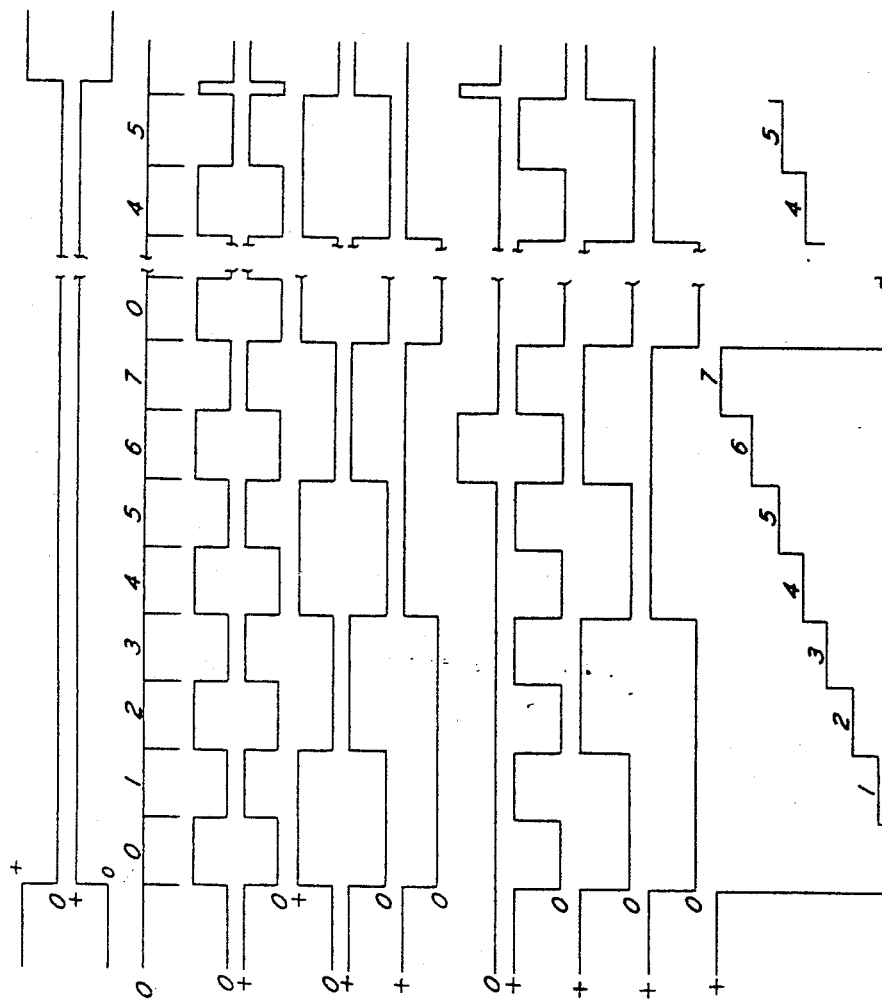
FIG. 4 is a timing diagram for the circuit of FIG. 3.

In FIG. 1, there is shown the telemetry system of the present invention generally designated by the numeral 10. It will be understood that like numerals in the drawings indicate like elements.

The telemetry system 10 includes a transmitter 12 for receiving information for transmittal to a receiver such as a ground station where the telemetry system 10 is included in a guided missile or the like. The transmitter 12 receives information from six standard data channels or signal transmitting means 14, 16, 18, 20, 22, and 24. Further, there is provided a calibration channel or calibration signal transmitting means 26 which is connected to the same output circuit 28 as the data channels 14–24. The data channels 14–24 receive information from input sources or signal input means 30, 32, 34, 36, 38 and 40. The input sources 30–40 are connected to suitable input terminals 42, 44, 46, 48, 50, and 52 of the data channels 14–24. When a particular data channel 14–24 is to be calibrated, the input through its respective terminal 42–52 is connected through an output terminal 54, 56, 58, 60, 62 and 64 to an input terminal 66 of calibration channel 26. After the information from a given data channel to be calibrated is fed to the calibrate channel 26 through input terminal 66 by means to be discussed below, a next data channel is connected to the input terminal 66 and the prior channel which was calibrated is returned to its initial state. The data channels 14–24 and the calibration channel 26 each additionally have a control terminal 68, 70, 72, 74, 76, 78 and 80, respectively, which control terminals receive individual signals from calibration relay gates 82 for placing one of the data channels or calibration channel into its calibration mode. When in such calibration mode, the particular data channel 14–24 or calibration channel 26 is set to receive a staircase voltage signal from a calibration signal generating means or calibrator 84.

In addition to transmitting signals to the transmitter 12, the data channels 14–24 and calibration channel 26 are each connected to data channel output gates 86 for transmitting the output signal of the channel being calibrtaed to an output level detector circuit or testing means 88. The output gates 86 are individually controlled by the calibration relay gate 82 so that only the channel being calibrated has its output signal transmitted to the output level detector 88. The output level detector 88 has, as its function, the measurement of the output signal of the calibrated channel when a calibration signal input has been applied thereto. If the calibration signal causes an output signal on the channel being calibrated which is of sufficient level to match a predetermined input, the output level detector will transmit a signal to a program sequencer 90 which is intended to change the channel being calibrated to another channel. The program sequencer 90, is first operative to initiate through the calibration relay gates 82 the changeover to a new channel to be calibrated. Further, the program sequencer 90 will reset the calibrator 84 for a next calibration cycle.

In order to understand the system of FIG. 1, it should be understood that present day calibration systems operate on the principal that an input data signal is supplied at various levels to the input terminals of voltage controlled oscillators to cause changes in frequency about predetermined center frequencies of the oscillator. These level changes are due to variable parameters in the overall system being measured. Thus, input data signal corresponding to parameters such as temperature, shock, etc. are supplied to the oscillators to vary their output sub-carrier signals about the center frequency. In utilizing this type of sub-carrier oscillator calibration technique, all data during the calibration cycle was lost when the voltage controlled oscillators were calibrated simultaneously. The telemetry system 10 herein described has provided two major improvements which may be considered as follows:

(a) Continuous data is provided during the calibration cycle.

(b) Protection is provided against the failure of the output signal from a given voltage controlled oscillator by the provision of a substitute voltage controlled oscillator.

In FIG. 1, it will be understood that each of the data channels 14–24 includes a voltage controlled oscillator as has been previously utilized in the prior art and in addition includes switching means in the input circuit thereof to connect a given data channel input terminal to the calibration channel 26 input terminal 66 when a calibration signal is received on the terminal (such as 78) of a data channel such as channel 24. Thus, the information from input source 40 will modulate the calibration channel 26 voltage controlled oscillator during the period that data channel 24 is being calibrated. It is obvious that the data channel 24 will have its information from input 40 continuously relayed to and through the calibration channel 26.

The output signal failure protection feature (b) of the present invention utilizes the output level detector 88 to compare the output voltage of data channel 24 when supplied a staircase voltage signal by the calibrator 84. If the output level of data channel 24 is normal, the output level detector level 88 passes a command pulse generated in the calibration 84 at the end of the calibration sequence to the programable sequencer 90. The sequencer 90 includes a counter which will step and select the next data channel to be calibrated. Thus, it will operate the particular calibration relay gate 82 necessary to transfer the live data from the calibration channel 26 back to the data channel 24 and additionally connect the next data channel 14 to the calibration channel 26. At the same time, the calibrator 84 is reset so that it can repeat the calibration cycle with the new data channel 14. It will be noted that the output from the staircase generator 84 is fed to terminals 92, 94, 96, 98, 100, 102 and 104 of the calibration channel 26 and data channels 14–24 respectively. However, only the channel that will be calibrated is internally switched so as to utilize the output signal from the calibrator 84. So long as the output level of each data channel is of the proper amplitude, the output level detector 88 will continue to pass command pulses so that each channel may be calibrated sequentially.

If the output of any channel is below normal, the output level detector 88 will not pass a command pulse to the programable sequencer 90. The malfunctioning data channel will remain in its calibration state and will be continuously monitored by the output level detector 88 until its operation returns to the normal state which condition would be sensed by the output level detector. While the particular data channel is out of commission, the calibration channel will receive its input data for transmission so that all of the data that normally passes through the malfunctioning channel will be transmitted to the transmitter 12. Should the particular malfunctioning channel begin to operate properly at a later time, this will be detected and the normal calibration procedure will be resumed.

In FIG. 2, the circuitry for the schematic diagram of FIG. 1 has been shown in a more specific form. Thus, the data channels 14–24 and calibration channel 26 each include a voltage controlled oscillator 106, 108, 110, 112, 114, 116, and 118, respectively. The voltage controlled oscillators 106–118 each are designed to operate on a different sub-carrier frequency which frequencies are combined at the transmitter for transmission to a receiving station. The voltage controlled oscillators 106–118 are operative to have their frequencies vary about a central frequency by changes in the input voltage thereto. As shown, each of the calibration channel 26 and data channels 14–24 also includes a double pole double throw relay 120, 122, 124, 126, 128, 130 and 132 which, in the initial or uncalibrated position, connects the input terminals 42–52 between the voltage controlled oscillators 108–118 and the input data sources 30–40. Accordingly, the voltage controlled oscillators 108–118 normally transmit the input data from sources 30–40 in the form of frequency modulated signals to the transmitter 12 through suitable output resistors 134, 136, 138, 140, 142, and 144, respectively. Also, the calibration channel 26 has an output resistor 146 connecting the output of the voltage controlled oscillator 106 to the input terminal 28 of transmitter 12.

It will further be noted that should one of the double pole double throw relays 122–132 be operated, this relay will connect its respective input terminal to the input terminal 66 of the calibration channel 26 so that the information source associated with the data channel being calibrated is directly connected to the voltage controlled oscillator 106 of the calibration channel 26.

The calibration relay gates 82 include a plurality of AND gates 148, 150, 152, 154, 156, 158, and 160 which are connected respectively to the input terminals 80, 68, 70, 72, 74, 76, and 78 of calibration channel 26 and data channels 14–24. The AND gates 148–160 are also respectively connected to one input of AND gates 162, 164, 168, 170, 172 and 174 of output gate 86. When a signal is received from a particular AND gate 148–160, it opens its associated AND gate 162–174 and further is operative to energize the particular double pole double throw relay 120–132 to which it is connected.

When the system is in operation for calibration purposes, the staircase generator 176 which is part of the calibrator 84 transmits its staircase voltage signal to the input terminals 92–104 of the calibration channel 26 and data channels 14–24. However, only that channel which has its double pole double throw relay energized will transmit the output signal from the staircase generator 176 to its associated voltage controlled oscillator 106–118. The output of the voltage controlled oscillators 106–118 are fed through calibration resistors 178, 180, 182, 184, 186, 188 and 190 to the other input terminals of AND gates 162–172. However, since only the channel being calibrated will have its associated AND gate open, and since that channel will have a staircase voltage signal supplied thereto, the output signal from the particular energized AND gate of output gate 86 should be a frequency pattern determined by the staircase voltage input from the staircase generator 176. This output frequency pattern should be such as to maintain a constant voltage which can be compared in the output level detector 88 to determine whether the particular voltage controlled oscillator 106–118 is operating properly. If the voltage controlled oscillator 106–118 is operating properly, the voltage received from the particular energized AND gate 162–172 will remain constant. The output signal from the particular AND gate 162–172 of output gate 86 is supplied through a forward biased diode 192 to a parallel circuit including capacitor 194 and resistor 196 which is connected between ground and the diode 192. The voltage on the capacitor 194 will build up so as to be compared in a voltage comparitor 198 with a reference voltage 200. If the voltage comparitor determines that the reference voltage is equal to the voltage across capacitor 194, a signal is supplied to an AND gate 202. The AND gate 202 receives command pulses from a reset gate circuit 204 which is part of the calibrator 84. The command pulses from the reset gate 204 are transmitted at the end of each calibration cycle in a manner to be discussed with respect to FIG. 3. Thus, at the end of each calibration cycle the AND gate 202 will transmit an output pulse if it has received both a command pulse from reset gate 204 and an output signal from the voltage comparitor 198.

The output signal from the AND gate 202 is connected to one input of a first flipflop circuit 206. The flipflop circuit 206 is part of the program sequencer 90 and is one of four flipflop circuits 206, 208, 210 and 212 each of which has an input terminal 211, 213, 214 and 216, a reset input terminal 218, 220, 222, and 224, a first output terminal 226, 228, 230, and 232, and a second output terminal 234, 236, 238, and 240. In the initial position, after a prior resetting, the terminals 234, 228, 230, and 232 are at zero potential, and the terminals 226, 236, 238, and 240 are at a positive potential. The flipflops 206, 208, 210 and 212 are each designed so that a positive going transient signal will cause the circuit to change its output state. Power is provided for the program sequencer 90 from the relay driver 242 of the calibrator circuit 84 along an input line 244 for energizing the AND gates 148–160. In the initial position prior to receipt of a signal through AND gate 202, the power supply signal from line 244, it will be noted, energizes one input terminal of AND gates 148–160. Further, the other inputs of AND gates 148–160 are respectively connected to separate diode matrix circuits associated with lines 246, 248, 250, 252, 254, 256, 258 and 260. Only that diode matrix which connects the input terminal of its respective AND gate to the output terminals of the flipflops 206, 208, 210 and 212 which are all at their positive potential will receive a signal for its AND gate. Since as can be seen, in the initial state only diode matrix 246 is set so as to provide an input signal to AND gate 148, only this AND gate will be energized so as to transmit its operating signal to the calibration channel 26. When an input signal is received on terminal 211 from AND gate 202, flipflop 206 is energized so that terminal 226 is at a zero potential and terminal 234 goes to a positive potential. The positive going signal from terminal 234 is applied to the input terminal 213 of flipflop circuit 208 energizing this flipflop circuit so that output terminal 228 rises from zero to a positive potential while output terminal 236 drops from the positive potential to zero. Since the negative going signal at terminal 236 cannot affect flipflop circuit 210, this flipflop circuit and flipflop circut 212 remain in their pre-set position. It will be noted, that only diode matrix circuit 248 is connected to all of the positive potential terminals of the flipflop circuits 206, 208, 210 and 212. Accordingly, only AND gate 150 will be energized and AND gate 148 will be de-energized. When AND gate 150 is energized data channel 14 will undergo calibration. With each additional pulse the diode matrices will successively be connected to the AND circuits 148–160 to successively energize the respective calibration circuits.

When diode matrix circuit 260 is energized due to the status of flipflop circuits 206, 208, 210 and 212, wherein terminals 232, 238, 236 and 234 are at a positive potential, the reset inputs 218, 220, 222 and 224 will be energized to return all the flipflops 206, 208, 210 and 212 to their initial position. Further, reset line 262 will also be energized to transmit a reset signal through rest driver 264 of the calibrator 84 to stop the operation of the staircase generator 176. Accordingly, it can be seen that the program sequencer 82 first calibrates the calibration channel 26 and then successively calibrates the data channels 14–24. After calibrating data channel 24 the calibrator 84 is turned off by the reset driver 264.

To initiate calibration, it is merely necessary to supply a calibration signal to an input terminal of flipflop circuit 268 in calibrator 84. Flipflop circuit 268 operates relay driver 242, to supply power to three flipflop circuits 270, 272, and 274. Further, the pulse generator 276 is energized by the relay driver to feed clock pulses to the flipflop circuit 270. The flipflop circuits 270, 272 and 274 will each feed the staircase generator 176 in a manner whereby a staircase voltage is provided at the output terminal 278 of the staircase generator 176. The flipflop circuits 270, 272 and 274 achieve with the staircase generator 176 a staircase voltage in timed relation and in a continuous manner until such time as the reset driver 264 stops the operation. At the end of the sixth step of each staircase cycle from the generator 176 the reset gate 204 supplies an output signal to the AND gate 202 to step the program sequencer 90 and to change the data channel to be calibrated in the manner discussed previously.

The operation of the calibrator 84 will best be understood with reference to the circuit thereof shown in FIGS. 3A and 3B and the voltage time diagram of FIG. 4 showing the state of various portions of the calibrator 84 circuit at any given time. As was noted previously, the first flipflop circuit 268 is energized from a calibrate command signal input 266. That is, the flipflop circuit 268 includes two transistors 280 and 282 in an initial state wherein the collector of transistor 282 is at a positive potential and the collector of transistor 280 is at a zero potential. The calibrate command signal from input 266 is applied to the base of transistor 282 energizing the flipflop circuit 268 to reverse the operation of transistors 280 and 282 so that the collector of transistor 282 will drop to zero. The collector of transistor 282, when it drops to zero potential, causes transistor 284, whose base circuit is connected to the collector of transistor 282. When the transistor 284 conducts, its collector voltage rises to a positive value causing the emitter of an emitter follower transistor 286 connected to transistor 284 to also rise to a positive potential. When emitter follower transistor 286 has its emitter rise to the voltage of the collector of transistor 284 it initiates three operations. First, it provides collector voltage for the collectors of transistors 288, 290, and 292 of flipflops 270, 272 and 274 respectively. Secondly, it starts the pulse generator 276 which is primarily a unijunction transistor 294 connected as an oscillator. Further, it energizes the AND gates 148-160 through line 244.

The energization of the unijunction transistor 294 causes clock pulses to be supplied to the base of a drive transistor 296 in a manner whereby negative current pulses are supplied through the collector emitter circuit of transistor 296.

It should be noted at this point that the flipflop circuits 270, 272, and 274 each consist of two transistors 288, 298, 290, 300 and 302, 292, respectively. Since the transistors 298, 300 and 302 are continuously supplied with a DC potential from source 304, these transistors are normally in the non-conducting state and thus have a positive potential on their collectors. Whereas transistors 288, 290, and 292 are supplied with their collector voltage by reason of the emitter follower 286, their potential is connected to the collector at a later point in time so that they are initially set with a zero potential and are in their conducting states.

When drive transistor 296 applies a negative going pulse to flipflop circuit 270, it causes a reversal thereof so that transistor 288 changes from zero potential on its collector to a positive potential, while transistor 298 changes from a positive potential to zero. When the collector of transistor 298 goes from positive potential to zero a negative pulse is generated which is operative to flip circuit 272 in a manner whereby transistor 290 has its collector voltage changed from zero to a positive potential, while transistor 300 has its collector voltage changed from a positive potential to zero. Since the collector voltage of transistor 300 changes in a negative direction, a negative going pulse of current is applied to flipflop circuit 274 causing transistor 302 to change from a positive potential on its collector to a zero potential thereon while transistor 292 has its collector voltage rise from zero to a positive potential.

This may be considered the first step of the calibration cycle.

When the next pulse from transistor 296 is applied to flipflop circuit 270, transistors 288 and 298 reverse their operation. However, since the collector of transistor 298 changes from zero to a positive potential there will be no change in the operation of flipflop circuits 272 or 274. Accordingly, they remain in the state as mentioned in the first step. At the end of the second step, a third pulse is supplied by transistor 296 causing another reversal of flipflop 276. Now, a negative going pulse from the collector of transistor 298 will cause a reversal of flipflop circuit 272. However, since transistor 300 goes from a zero potential to a positive potential there will be no affect on transistor flipflop circuit 274.

With the fourth pulse applied to flipflop circuit 270, the collector of transistor 298 will again go from zero to a positive value but without affecting the operation of flipflop circuit 272.

With the fifth pulse from transistor 296, transistor 288 will go from the zero potential to a positive potential whereas transistor 298 will go from a positive potential to a zero potential. This negative going pulse from the collector of transistor 298 will cause a reversal of flipflop circuit 272 so that transistor 290 will change from zero to a positive potential while transistor 300 will go from a positive potential to zero. This last negative going signal will activate flipflop circuit 274 in a manner whereby transistor 302 will change from zero to a positive potential and transistor 292 will go from a positive collector potential to zero.

When the sixth pulse from transistor 296 is supplied to the flipflop circuit 270, the collector of transistor 288 changes from a positive signal to zero and the collector of transistor 298 goes from zero to a positive signal. Therefore, there is no additional affect on transistor flipflop circuits 272 and 274. When the seventh pulse from transistor 296 is supplied to the flipflop circuit 270 the collector of transistor 298 goes from a positive value to zero causing flipflop circuit 272 to operate with transistor 290 changing from a positive potential to zero and transistor 300 changing from zero to a positive potential. At this time, for reasons which will be discussed below the reset gate 204 will transmit a reset pulse. The counter continues to operate through an eighth pulse, with the ninth pulse being similar to the first pulse discussed above. It should be noted that after all data channels are calibrated, the transistor 280 has a reset signal supplied thereto from the reset driver circuit 264 which receives a pulse signal along line 262 from the program sequencer 90 in the manner discussed with respect to FIG. 2B. When the positive pulse is applied to the base of transistor 280, it causes transistor 280 to conduct, and therefore the collector of transistor 282 will rise to a positive potential. Transistor 284 will be cut off so that its collector potential will go to zero. Since transistor 286 is an emitter follower, its emitter will also go to zero taking off the collector voltages for transistors 288, 290 and 292 thus resetting the flipflops 270, 272 and 274 to their initial position.

The staircase generator 176 comprises a transistor 304 having its base connected to the midpoint between a Zener diode 306 and a resistor 308. The emitter of constant current generating transistor 304 is connected to three parallel resistors 310, 312, and 314. Each of the resistors 310, 312, and 314 is connected through a diode 316, 318, and 320 to the DC source 304. The DC source 303 is regulated by a Zener diode regulating circuit 322 in a conventional manner. It can be shown by a rigorous mathematical derivation that the current through the collector resistor 324 of transistor 304 is substantially equal to the voltage across Zener diode 306 divided by the resistance in the emitter circuit of transistor 304, if the voltage of the Zener diode 306 is made substantially greater than the emitter-to-base voltage of transistor 304. It will be noted that in designing the values of the resistances 310, 312 and 314 for the purpose of providing a staircase voltage function, the resistance 310 should be one-quarter the resistance of resistor 314 and the resistance of resistor 312 should be one-half that of resistor 314.

It will be noted that the resistor 314 is connected to the emitter of transistor 326 which transistor has its base connected to the collector of transistor 298; resistor 312 is connected to the emitter of transistor 328 which transistor has its base connected to the collector of transistor 300; and resistance 310 is connected to the emitter of transistor 330 which has its base connected to the collector circuit of transistor 302. Whenever one of the transistors 326, 328, or 330 has its emitter at a zero potential, its associated resistor is effectively disconnected from the emitter of transistor 304. This is due to the fact that the DC potential from source 303 is blocked by the respective diodes 316, 318 and 320. However, should the emitter of a particular transistor 326, 328, or 330 go to a positive value, this will place in the emitter circuit of transistor 304 the associated resistor 314, 312 or 310. It should further be noted that the constant current generator 304 is not affected by variations in the voltage supplied. This is due to the clamping action of diodes 316, 318 and 320 which effectively limits the positive potential on resistors 310, 312 and 314 respectively to the forward going drop across the diodes plus the voltage across Zener diode 322. Thus, it is only affected by the particular resistor placed in the emitter circuits.

Accordingly, when the flipflop circuits 270, 272 and 274 have received the first pulse from transistor 296, the collectors of transistors 298, 300, and 302 are all at a zero potential so that the emitters of transistors 324, 328 and 330 are also at zero causing the emitter resistance of transistor 304 to be infinity. Accordingly, there is no current through collector resistor 324.

When, after the second pulse, the collector of transistor 298 becomes positive, transistor 326 will have its emitter at the potential of source 303 so that the resistor 314 is placed in the emitter circuit of transistor 304 to provide one unit of current flowing through the collector resistor 324. After the third pulse, the collector of transistor 298 returns to zero while the collector of transistor 300 rises to a positive value causing transistor 328 to conduct and placing the resistor 312 in the emitter circuit of transistor 304. Since resistor 312 is one-half the size of resistor 314 the current through the collector resistor 324 will be equal to two units thereof. With the fourth pulse, both the collectors of transistors 298 and 300 will be positive and resistors 312 and 314 will be placed in the emitter circuit so that three units of current will pass through collector resistor 324. With the fifth pulse, both of the collectors of transistors 298 and 300 will return to zero while the collector of transistor 302 will rise to a positive value causing transistor 330 to conduct and placing resistor 310 in the emitter circuit of transistor 304. Since resistor 310 is one-fourth the size of resistor 314, four units of current will flow through collector resistor 324. After the sixth pulse, resistors 310 and 314 will be placed in the emitter circuit so that transistor 304 will conduct five units of current through resistor 324. Accordingly, as can be seen, a staircase function having six steps starting from zero to five units of current has flown through resistor 24. This signal is transmitted through line 278 in the manner discussed with respect to FIG. 2.

The commend pulse discussed with respect to FIG. 2 which passed out of the reset gate 204 to AND gate 202 is supplied in the following manner. The reset gate 204 is comprised of three diodes 332, 334 and 336 connected respectively to the collectors of transistors 288, 300, and 302. If one of the collectors of transistors 288, 300, and 302 is zero potential, the AND circuit 202 will not pass any signals. However, if all of the collectors of transistors 288, 300, and 302 are at a positive potential, the AND gate 202 will pass the signal from the voltage comparitor 198. It should be noted that the occurence of positive potentials on the collectors of transistors 288, 300 and 302 occurs only on the seventh pulse received from transistor 296. Accordingly, after a complete cycle of calibration and the generation of a staircase function, a command pulse is transmitted to the AND gate 202 by reason of the operation of the reset gate 204 formed of diode 332, 334 and 336.

It should be noted that the objects of the present invention have been achieved by the utilization of a staircase voltage generating system for a telemetry device which has accurately generated a staircase voltage function without the need for special precision resistors switched into position by way of relays or static switching elements. Rather, with a single constant current generator 304 and the utilization of a simple counter formed of flipflops 270, 272 and 274 this invention has provided all of the desired results in a simple and easy manner. Further, it should be noted that the calibrator 84 could be utilized to reset itself by merely connecting the output of the reset gate 204 directly to input line 262.

Still further, the objects of the present invention have been achieved by the provision of a telemetry system in which a calibration channel has been provided with associated switching means for connecting the calibration channel to the data input for a channel to be calibrated and calibrating that data channel while its information was continuously being transmitted. The calibration operation is sequentially affected so as to complete the calibration of all the data channels while continuously transmitting all of the data through the transmitter. The calibration sequence, once started, continues until all of the channels have been calibrated. If one channel is not operating for some reason, whether temporary or permanent, the calibration sequencing will stop and the calibration channel will form a somewhat permanent replacement for the effective channel. Meanwhile, the defectve channel will be continuously calibrated from the staircase generator 176 until such time as it is operative. When such time comes, the system will continue its sequential operation and the calibration channel will again perform its substitute duties with respect to the other channels being calibrated.

Obviously many modifications and variations of the present invention are possible in the light of the above teachings. It is, therefore, to be understood that within the scope of the appended claims, the invention may be practiced otherwise than as specifically described.

What is claimed as the invention is:

1. A telemetry system comprising a plurality of communication channels, a plurality of signal input means each associated with a respective one of said communication channels, a calibration channel, calibration signal generating means, cyclic switching means for sequentially switching one of said signal input means from one of said communication channels to said calibration channel at the same time as said calibration signal generating means is connected to said one communication channel.

2. The telemetry system of claim 1 including testing means for testing the communication channel connected to said calibration signal generating means, said switching means being operative to connect said one communication channel to said testing means at the same time as said calibration signal generating means is connected to said one communication channel.

3. The telemetry system of claim 2 wherein said plurality of communication channels are each operative to transmit a signal of varying amplitude, said calibration signal generating means being operative to control said one communication channel to produce an output signal of a given amplitude, said testing means being operative to compare the output signal of said one communication channel against a reference signal, said testing means being further operative to control said switching means to switch said calibration signal generating means to a second communication channel and to switch said one signal input means back to said one communication channel when said one communication channel output signal compares in a predetermined manner to said testing means reference signal.

4. The telemetry system of claim 3 wherein said calibration signal generating means includes a staircase signal generator, said staircase signal generator being operative to produce a staircase output signal so as to apply a controlled variable signal to the channel connected thereto.

5. The telemetry system of claim 4 wherein said staircase signal generator is operatively connected to a plurality of bistable circuits connected as a counter, drive means for said counter, said drive means being initiated by a calibration input signal and enabling the said counter to be stepped so that a staircase signal is generated by said staircase signal generator.

6. The apparatus of claim 5 wherein said staircase generator includes a constant current generator, said constant current generator being resistance dependent, each of said bistable circuits being operative to control a resistor of said constant current generator, each of said bistable circuits controlling said constant current generator resistance in a predetermined relationship so as to vary the current output signal of said constant current generator in accordance with the state of said counter.

7. The telemetry system of claim 6 wherein said staircase signal generator is operative to produce a reset signal to stop the operation of said counter after a predetermined count is produced on said bistable circuits, said reset signal being further operative to return said counter to an initial position.

8. The telemetry system of claim 1 including a programmable sequencing means, output measuring means, said output measuring means being operative to measure any one of said channels, said switching means being operative to connect said one communication channel to said output measuring means, said programmable sequencing means being operatively connected to said output measuring means to control said switching means to calibrate a second communication channel upon receipt of a signal from said output measuring means indicating said one communication channel is in operating order.

9. The telemetry system of claim 8 wherein said programmable sequencing means is operative to control said switching means to connect said calibration signal generating means to each of said channels in sequential order while connecting the respective signal input means successively to said calibration channel.

10. The telemetry system of claim 9 wherein said calibration signal generating means is operative to provide a plurality of calibration pulses as its output signal, said programmable sequencing means being operative to produce an output signal for controlling said switching means only after a predetermined number of output signals have been transmitted by said calibration signal generating means.

11. The telemetry system of claim 1 wherein said communication channel are voltage controlled oscillators, each of said voltage controlled oscillators being operative to transmit a frequency band different from every other communication channel, said calibration channel being a voltage controlled oscillator whose output frequency band is different from the output frequency bands of said communication channels, each of said communication channels and said calibration channel being variable in a similar manner with respect to changes in voltage input thereto.

12. The telemetry system of claim 1 including output signal measuring means, said output signal measuring means being operative to measure the output signal of said channels, said output signal measuring means being further operative to maintain said calibration signal generating means connected to said one communication channel when the output signal of said one channel deviates from a predetermined value.

13. A telemetry system comprising a plurality of data channels, a plurality of data input signal means each associated with one of said data channels, a calibrator, a calibartion channel, cyclic control means for sequentially switching one of said data signal input means from one of said data channels to said calibration channel at the same time as said calibrator is connected to said one data channel, and a transmission means for receiving and collectively transmitting the output signals of said data channels and said calibration channels.

14. The apparatus of claim 13 wherein said calibrator is operative to provide a plurality of control data signals to said one data channel to induce a predetermined output signal from said one data channel, and measuring means being operatively connected to said one data channel for determining whether said one data channel produces said predetermined output signal in accordance with the output of said calibrator.

15. The telemetry system of claim 14 wherein said calibrator and said measuring means are consecutively operative to connect a second data channel to said calibrator, further connect a second data input means to said calibration channel, and to further reconnect said one data input means to said one data channel when said measuring means determines said one data channel produces said predetermined output signal.

References Cited
UNITED STATES PATENTS

| 1,570,741 | 1/1926 | Harden | 179—175.3 |
| 1,690,213 | 11/1928 | Wilson | 179—175.31 |
| 2,753,547 | 7/1956 | Donath | 340—177 |
| 2,761,922 | 9/1956 | Carroll | 179—175.3 |
| 2,986,610 | 5/1961 | Maurushat | 179—175.3 |

NEIL C. READ, *Primary Examiner.*

THOMAS B. HABECKER, *Examiner.*